Oct. 23, 1951  J. T. ROGERS  2,572,521
SEAT
Filed Aug. 4, 1948
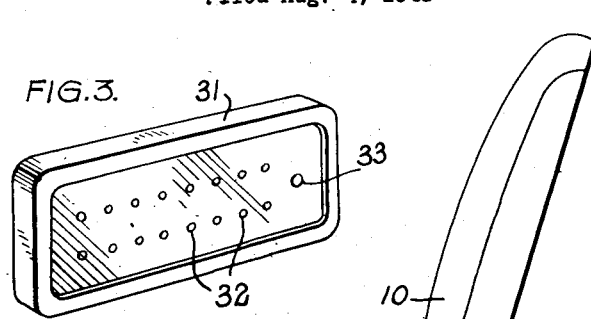
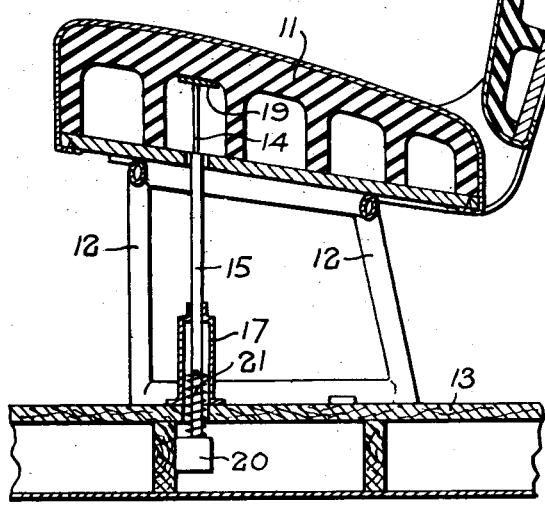
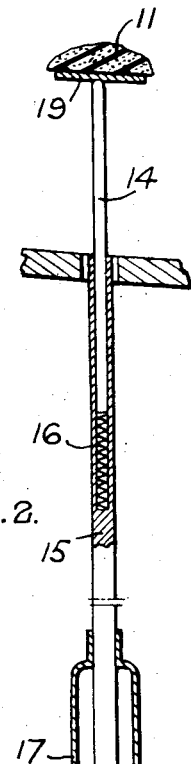
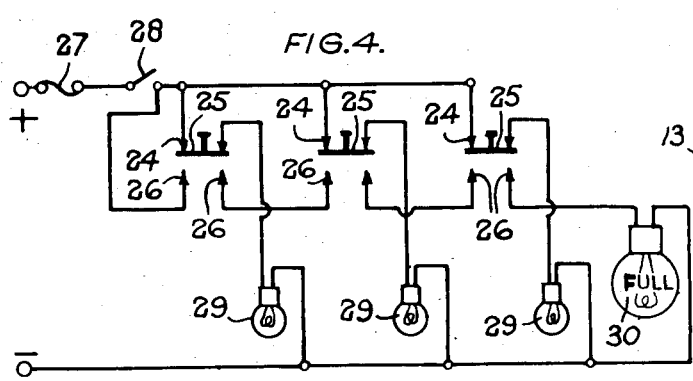
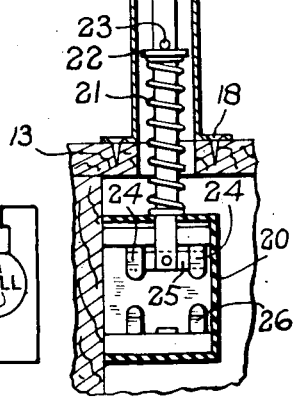
INVENTOR:
John Thomas Rogers.
BY Richardson and David
ATTY'S

UNITED STATES PATENT OFFICE 2,572,521

SEAT

John Thomas Rogers, Dudley, England

Application August 4, 1948, Serial No. 42,450
In Great Britain August 13, 1947

4 Claims. (Cl. 155—188)

This invention relates to electric indicating devices for indicating whether seats are vacant or occupied from a remote position in public vehicles and places of entertainment. The invention is concerned with that kind of indicating device which incorporates switch mechanism which is operated when a person occupies a vacant seat.

In connection with public vehicles it is very desirable that the conductor shall know at all times the number of vacant seats, and when arriving at a stopping place the conductor frequently does not know how many seats on the top of the vehicle are unoccupied, and consequently does not know how many passengers can be admitted.

In connection with places of entertainment, such as cinema theatres, it is desirable that similar particulars shall constantly be available at the ticket office.

The object of the present invention is to provide an improved automatic indicator to show at a glance the number of unoccupied seats. The indicator may be arranged to indicate not only the number of unoccupied seats but the position thereof.

According to the present invention, the individual seats in vehicles and places of entertainment are provided with electric switches which are automatically operated when the seat is occupied, and automatically operated in the reverse direction when the seat is unoccupied, and the leads from these switches are taken to an indicator board having means operated by the electric current in the circuit or circuits for indicating the number of unoccupied seats.

In the case of vehicle and cinema seats, the seat usually has a foundation and a seat top, and springs between the top and the foundation, and when the seat is occupied the seat top is depressed and this movement can be utilized for operating the switch in one direction; when the seat is vacated the switch is automatically operated in the reverse direction. The switches may actually be mounted in the floor of the vehicle, or the floor of the place of entertainment, but the actual operation of the switch is derived from the movement of the top of the seat. The switches may be opened when the seat is occupied, and automatically closed when the seat is unoccupied.

When the place of entertainment or the vehicle is only sparsely occupied it is unnecessary to make use of the indicator, and a master switch may be provided in the circuit for placing the system in and out of action as required. In the case of a public vehicle, the conductor can switch the indicator into operation when the vehicle, and particularly the top deck, is nearly full; and similarly in the case of a place of entertainment, the system can be switched on when there are relatively few seats unoccupied.

The indicator may take the form of a board having a number of small lamps arranged similarly to the seating accommodation, and the lamps which correspond with unoccupied seats will be automatically turned on so that the indicator will indicate not only the number of unoccupied seats but also their position.

More than one indicator may be provided. In the case of a public vehicle one indicator may be placed near the conductor's platform and preferably visible to intending passengers, and another indicator may be provided for the driver so that he can see at a glance what loading he has on the top deck.

In the case of a vehicle the system may be operated from the batteries of the vehicle, but in the case of places of entertainment the system may be operated from the mains with the voltage preferably reduced by using a transformer.

Referring to the drawings:

Figure 1 is a section through a seat embodying the present invention.

Figure 2 is an enlarged sectional view of the switch operating mechanism.

Figure 3 is a view showing an indicating board for use in the present invention.

Figure 4 is a diagram of the electric circuit for the switches and indicating board.

In the construction shown the seat comprises a seat back 10 and bottom 11 supported upon legs 12 which are fixed to a foundation 13 which may be the upper deck of a passenger vehicle or the floor of a cinema.

The switch and operating mechanism for each seat, as shown in Figure 2, comprises a rod 14 slidably mounted in the top of a part tubular column 15, a spring 16 being provided between the end of the rod 14 and solid inner end of the column 15. A housing 17 surrounds and guides the lower end of the column 15 and is secured to the foundation 13 by screws or nails 18. The upper end of rod 14 bears upon a pressure plate 19 fixed to the underside of the seat bottom 11.

The switch mechanism is contained inside a waterproof housing 20 fixed below the foundation 13 and a coiled spring 21 is placed on the column 15 so as to urge the column upwardly. The spring 21 acts between the top of casing 20 and a washer 22 bearing against a pin 23 projecting from the column 15.

The housing 20 has mounted inside, at the top thereof, two switch members 24, each of the bifurcated type, and the column 15 carries at its lower end a knife switch member 25. Two corresponding switch members 26 are provided in the case of the housing 20 so that when the knife 25 is in the upper position, switch members 24 are connected and when in the lower position, switch members 26 are connected.

A suitable electric circuit is shown in Figure 4, having a fuse 27, master switch 28 and lamps 29, each lamp 29 corresponding to one seat. A lamp 30 is also provided to indicate when all seats are full.

When the circuit is in operation, with master switch 28 closed, it will be seen that as long as a seat is unoccupied the corresponding lamp 29 will be lit, the circuit to the lamp being completed through switch member 24 and knife 25. When the seat is occupied, column 15 descends under the weight of the sitter and knife 25 moves down to engage switch members 26 and break the circuit to lamp 29 so that the lamp goes out. When all seats are occupied and all the knife members 25 are down, the circuit to lamp 30 is complete so that this lamp then lights to indicate that all seats are occupied.

An indicator board is shown in Figure 3 and this comprises a casing 31 in which are mounted the lamps 29 and the lamp 30. The lamps 29 are arranged each behind an aperture 32 and the lamp 30 behind an aperture 33. In the case of the upper deck of an omnibus the lamps 29 may be arranged to correspond to the relative positions of the seats.

In the case of double seats, a separate switch mechanism and lamp is provided for each part of the seat and to ensure that, when one half is occupied the weight of the sitter does not also operate the other switch, the rod 14 is spring loaded by the spring 16 so that the rod 14 has to move down a short distance before the column 15 commences to move downwardly. Hence it is necessary to get the full weight of a sitter bearing directly over the rod 14 to operate the switch mechanism fully and the slight depression caused by a person occupying the adjacent half of a double seat will not be sufficient to cause the switch to operate.

This arrangement also provides against the possibility of the switch being caused to operate when lightweight articles (such as parcels, shopping bags and clothes) are placed on the seat, as is frequently the case in cinemas and public vehicles.

The housings 17 and 20 ensure that the electrical portions of the switch mechanism are kept watertight.

What I claim then is:

1. An electrically operated indicating device of the type specified in which each individual seat is provided with an electric switch adapted to be automatically operated in one direction when the seat is occupied and in the reverse direction when the seat is vacated, each switch comprising, a switch operating rod arranged substantially vertically beneath the seat with one end engaging the under side of the seat and adapted to be moved into the operative position by the weight of a person occupying the seat, switch mechanism adapted to be actuated by said rod, said switch mechanism including a slidable column having an electrical contact at its lower end and having a recess in its upper part to receive the lower end of said operating rod, spring means inserted in said recess below the end of said rod and engaging the bottom of the recess, so arranged that the operating rod moves a substantial distance to overcome the resistance of the spring pressure before commencing to move the column, and electric leads connecting each switch to an indicator having means operated by the electric current in the circuit for indicating the number of unoccupied seats.

2. An electrically operated indicating device of the type specified in which each individual seat is provided with an electric switch adapted to be automatically operated in one direction when the seat is occupied and in the reverse direction when the seat is vacated, each switch comprising, a switch operating member adapted to be moved into the operative position by the weight of a person occupying the seat, switch mechanism adapted to be actuated by said operating member, interconnecting means between the operating member and the switch mechanism so arranged that the operating member moves a substantial distance before commencing to actuate the switch mechanism, and electric leads connecting each switch to an indicator comprising a panel having lamps mounted thereon, each lamp corresponding to one seat and being in circuit when the seat is unoccupied and a further lamp connected in circuit with contact members associated with each switch mechanism, such contact members being electrically connected when each seat is occupied and each switch has been operated.

3. An electrically operated indicating device of the type specified in which each individual seat is provided with an electric switch adapted to be automatically operated in one direction when the seat is occupied and in the reverse direction when the seat is vacated, each switch comprising, a switch operating rod arranged substantially vertically beneath the seat with one end engaging the under-side of the seat and adapted to be moved into the operative position by the weight of a person occupying the seat, switch mechanism mounted on the seat foundation and including a contact carrying member operatively associated with said operating rod and adapted to be actuated thereby, spring means operatively disposed between the operating rod and the contact carrying member so arranged that the operating rod moves a substantial distance to overcome the resistance of the spring pressure before commencing to actuate the contact carrying member, and electric leads connecting each switch to an indicator having means operated by the electric current in the circuit for indicating the number of unoccupied seats.

4. An electrically operated indicating device of the type specified in which each individual seat is provided with an electric switch adapted to be automatically operated in one direction when the seat is occupied and in the reverse direction when the seat is vacated, each switch comprising, a switch operating rod arranged substantially vertically beneath the seat with one end engaging the underside of the seat and adapted to be moved into the operative position by the weight of a person occupying the seat, switch mechanism mounted upon the seat foundation and adapted to be actuated by said operating rod, interconnecting spring means between the operating rod and the switch mechanism so arranged that the operating rod moves a substantial distance before commencing to actuate the switch mechanism to break an electrical circuit which connects each switch to an indicator, comprising a panel having lamps mounted thereon, one lamp in each switch circuit corresponding to an individual seat.

JOHN THOMAS ROGERS.

REFERENCES CITED

The following references are of record in the file of this patent:

UNITED STATES PATENTS

| Number | Name | Date |
|---|---|---|
| 1,488,888 | Lewensohn | Apr. 1, 1924 |
| 1,888,136 | McDermott | Nov. 15, 1932 |
| 2,359,254 | Silver | Sept. 26, 1944 |